(12) United States Patent
Qin et al.

(10) Patent No.: US 11,718,792 B2
(45) Date of Patent: Aug. 8, 2023

(54) FLY ASH-BASED ENVIRONMENTALLY-FRIENDLY HYDROGEL WITH HIGH WATER RETENTION FOR PREVENTING AND CONTROLLING SPONTANEOUS COMBUSTION OF COAL IN MINE AND PREPARATION METHOD THEREOF

(71) Applicant: CHINA UNIVERSITY OF MINING AND TECHNOLOGY, Jiangsu (CN)

(72) Inventors: Botao Qin, Jiangsu (CN); Quanlin Shi, Jiangsu (CN); Mingyue Hao, Jiangsu (CN); Shuang Zhao, Jiangsu (CN); Yizhen Xu, Jiangsu (CN); Xu Shao, Jiangsu (CN); Zujie Ma, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/071,653

(22) Filed: Nov. 30, 2022

(65) Prior Publication Data

US 2023/0167366 A1    Jun. 1, 2023

(30) Foreign Application Priority Data

Nov. 30, 2021  (CN) .......................... 202111447954.3

(51) Int. Cl.
| | |
|---|---|
| C09K 21/10 | (2006.01) |
| C09K 21/02 | (2006.01) |
| C10L 5/02 | (2006.01) |
| C10L 10/00 | (2006.01) |

(52) U.S. Cl.
CPC .............. C09K 21/10 (2013.01); C09K 21/02 (2013.01); C10L 5/02 (2013.01); C10L 10/00 (2013.01)

(58) Field of Classification Search
CPC .................................................... C09K 21/14
See application file for complete search history.

(56) References Cited

FOREIGN PATENT DOCUMENTS

| CN | 101265811 A | * | 9/2008 |
|---|---|---|---|
| CN | 111019047 | | 4/2020 |
| CN | 111214799 | | 6/2020 |
| CN | 111744133 | | 10/2020 |
| CN | 112999558 | | 6/2021 |
| CN | 113213821 | | 8/2021 |

OTHER PUBLICATIONS

English machine translation of Qin et al. CN101265811A. (Year: 2008).*
Qin et al. "A superabsorbent hydrogel-ascorbic acid composite inhibitor for the suppression of coal oxidation," Fuel, 2017, 190, 129-135. (Year: 2017).*
Cheng et al. "An intelligent gel designed to control the spontaneous combustion of coal: Fire prevention and extinguishing properties," Fuel, 2017, 210, 826-835. (Year: 2017).*
Deng et al. "Application of composite fly ash gel to extinguish outcrop coal fires in China," Nat Hazards, 2015, 79, 881-898. (Year: 2015).*

* cited by examiner

*Primary Examiner* — Peter F Godenschwager
(74) *Attorney, Agent, or Firm* — JCIP Global Inc.

(57) ABSTRACT

The present invention provides a fly ash-based environmentally-friendly hydrogel with a high water retention for preventing and controlling spontaneous combustion of coal in a mine and a preparation method thereof. The hydrogel includes the following raw materials in the following weight percentages: 10% to 30% of a gel-forming material A, 20% to 45% of a crosslinking material B, and water as a balance, where the gel-forming material A is prepared by physical blending of a biodegradable superabsorbent resin, anionic polyacrylamide, a sesbania gum, and fly ash in a weight ratio of (1-3):(0.5-1):(0.5-1):(95-98); and the crosslinking material B is prepared by subjecting zeolite, expandable graphite, and an aluminum citrate complex in a weight ratio of (60-78):(20-36):(2-4) to mixing, dispersing, adsorbing, and freeze-drying. The gel-forming material A is added to water and stirred at room temperature until homogeneous, and then the crosslinking material B is added and stirred until homogeneous to obtain the hydrogel. In the present disclosure, the environmentally-friendly hydrogel with the high water retention is prepared with wastes such as fly ash as a base material, and can be prepared simply with a low cost. In addition, the hydrogel has the advantages of degradability, strong water retention, and a controllable gelation time. The hydrogel can cover and wet a coal body for a long time, and prevent and control the spontaneous combustion of coal in a mine for a prolonged time.

10 Claims, No Drawings

FLY ASH-BASED ENVIRONMENTALLY-FRIENDLY HYDROGEL WITH HIGH WATER RETENTION FOR PREVENTING AND CONTROLLING SPONTANEOUS COMBUSTION OF COAL IN MINE AND PREPARATION METHOD THEREOF

CROSS-REFERENCE TO RELATED APPLICATION

This application claims the priority benefit of Chinese application serial no. 202111447954.3, filed on Nov. 30, 2021. The entirety of the above-mentioned patent application is hereby incorporated by reference herein and made a part of this specification.

BACKGROUND

Technical Field

The present disclosure relates to the technical field of hydrogel preparation, and in particular, to a fly ash-based environmentally-friendly hydrogel with a high water retention for preventing and controlling spontaneous combustion of coal in a mine and a preparation method thereof.

Description of Related Art

Coal is one of the main energy sources in China. With the transformation in the pattern of economic growth of the coal industry and the expansion of coal uses, the coal has maintained itself at an extremely important strategic position. However, coal mining faces serious spontaneous combustion. The spontaneous combustion not only burns a large amount of coal resources, but also produces toxic and harmful gases, endangering the life safety of underground workers and the normal mining of working faces, and even rendering a series of disasters such as gas explosion. Generally, the spontaneous combustion of coal in a mine is prevented and controlled by grouting, nitrogen injection, chemical inhibitor spraying, colloidal material injection, foam injection and the like. However, all of these technologies have certain defects and deficiencies, with an unsatisfactory effect in preventing and extinguishing a fire.

In recent years, gel materials have attracted more and more attention from scholars at home and abroad due to their desirable fluidity and permeability before gelation, as well as excellent water retention, leakage plugging, and oxygen barrier properties after gelation. However, the existing inorganic gel-based fire-preventing/fire-extinguishing materials, such as water glass gel widely used at present, have a low ultimate deformation rate and a poor dynamic pressure resistance, which are prone to rupture with the deformation of a coal stratum under a mining influence, resulting in decreased air leakage prevention performance. Moreover, the inorganic gel is easy to be pulverized due to water loss, and thus only achieves short-term oxygen barrier protection and water retention for coal, with a limited effect on long-term prevention and control of the spontaneous combustion of coal. In addition, the existing preparation methods for mining gel materials each involve a complex processing procedure and harsh conditions, requiring strong acids and strong bases as raw materials, while entailing harsh experimental conditions such as a high temperature and a high pressure during the preparation. These lead to a high risk and poor environmental protection during the preparation of mining gel materials, which eventually greatly increases the cost of the mining gel materials and limits the wide-scale promotion and application of the mining gel materials in coal mines.

The patent applications CN111214799A, CN111019047A, and CN111744133A respectively disclose preparation methods of mining hydrogel-based fire-preventing/fire-extinguishing materials, which realize oxygen-barrier, cooling, and flame-retardant effects on igniting coal by properties of water-bearing and bonding of the materials themselves, but involve a complex process, harsh preparation conditions, and a high material cost. During the gel preparation processes, strong acids and strong bases such as sodium hydroxide and ammonium persulfate are required, or other toxic and harmful substances are used, resulting in a dangerous and non-environmental-friendly preparation process.

SUMMARY

An objective of the present disclosure is to provide a fly ash-based environmentally-friendly hydrogel with a high water retention for preventing and controlling spontaneous combustion of coal in a mine. The hydrogel has the advantages of environmental friendliness, strong water retention, and excellent accumulation, and can achieve long-term wetting and coverage of residual coal in a goaf, thereby effectively preventing and controlling the spontaneous combustion of coal in a mine for a long time.

Another objective of the present disclosure is to provide a preparation method of the fly ash-based environmentally-friendly hydrogel with the high water retention for preventing and controlling the spontaneous combustion of the coal in the mine. The preparation method does not require any harmful substances such as strong acids and strong bases, and does not require harsh experimental environments such as a high temperature and a high pressure, which can be used for industrial production.

In order to achieve the above objectives, the present disclosure adopts the following technical solutions.

The present disclosure provides a fly ash-based environmentally-friendly hydrogel with a high water retention for preventing and controlling spontaneous combustion of coal in a mine, including the following raw materials in the following weight percentages: 10% to 30% of a gel-forming material A, 20% to 45% of a crosslinking material B, and water as a balance; where the gel-forming material A is prepared by physical blending of a biodegradable superabsorbent resin, anionic polyacrylamide, a sesbania gum, and fly ash in a first weight ratio of (1-3):(0.5-1):(0.5-1):(95-98); the crosslinking material B is prepared by subjecting zeolite, expandable graphite, and an aluminum citrate complex in a second weight ratio of (60-78):(20-36):(2-4) to mixing, dispersing, adsorbing, and freeze-drying.

Preferably, the gel-forming material A is prepared by the following steps:

1.1) weighing the biodegradable superabsorbent resin, the anionic polyacrylamide, and the sesbania gum according to the first weight ratio, followed by uniform mixing by ball milling to obtain a polymer powder; and 1.2) adding the fly ash to the polymer powder according to the first weight ratio, followed by uniform mixing by ball milling to obtain the gel-forming material A.

Preferably, the crosslinking material B is prepared by the following steps:

2.1) weighing the zeolite and the expandable graphite according to the second weight ratio, followed by uniform mixing by ball milling to obtain an inorganic powder;

2.2) adding the inorganic powder to water according to a third weight ratio of (20-30):(70-80), followed by stirring at room temperature for 30 min to 50 min, such that the inorganic powder is completely dispersed in the water to obtain a homogenous inorganic powder suspension;

2.3) weighing the aluminum citrate complex according to the second weight ratio, adding the aluminum citrate complex to the inorganic powder suspension, followed by stirring at room temperature for 30 min to 50 min, such that particles of the inorganic powder fully adsorb the aluminum citrate complex to obtain a homogenous crosslinking material B suspension;

2.4) freeze-drying the crosslinking material B suspension to obtain a dry crosslinking material B block; and 2.5) subjecting the crosslinking material B block to ball milling to a particle size of 30 mesh or less to obtain the crosslinking material B.

Preferably, in the gel-forming material A, the fly ash is grade-II fly ash.

Preferably, in the crosslinking material B, the zeolite has a particle size of 10 mesh to 30 mesh, and the expandable graphite has a particle size of 10 mesh to 30 mesh.

Preferably, in the steps 1.1), 1.2), 2.1), and 2.5), the ball milling is performed at 100 r/min to 300 r/min for 10 min to 30 min.

Preferably, in the step 2.4), the freeze-drying is performed at −60° C. to −30° C. and a vacuum degree of 5 Pa to 10 Pa for 40 h to 90 h.

The present disclosure further provides a preparation method of the fly ash-based environmentally-friendly hydrogel with the high water retention for preventing and controlling the spontaneous combustion of the coal in the mine, including the following steps:

1) adding the gel-forming material A to water according to the weight percentages, followed by stirring at a room temperature for 5 min to 10 min to obtain a homogenous composite suspension; and 2) adding the crosslinking material B to the composite suspension according to the weight percentages, followed by stirring at room temperature for 3 min to 5 min to obtain the fly ash-based environmentally-friendly hydrogel with the high water retention for preventing and controlling the spontaneous combustion of the coal in the mine.

Compared with the prior art, the present disclosure has the following beneficial effects.

1. In the present disclosure, the aluminum citrate complex is blended with zeolite and expandable graphite by ball milling, such that the aluminum citrate complex is adhered to a powder of the zeolite and the expandable graphite. With the zeolite and the expandable graphite as carriers, the aluminum citrate complex can be uniformly dispersed in water by virtue of excellent suspension and dispersion properties of the carriers in water, avoiding agglomeration and insufficient dissolution of polymers in water. The zeolite has many tubular channels with a uniform pore size and pores with a large internal surface area. A crystal structure of the zeolite is a three-dimensional lattice connected by silicon (aluminum)-oxygen tetrahedra. There are various cavities and channels of different sizes in the lattice, with great openness. The cavities of different sizes in the lattice can absorb or filter molecules of other substances of different sizes. Therefore, the zeolite has unique properties of adsorption, screening, and exchange of anions and cations, and can adsorb organics and heavy metal ions in water. Expandable graphite is a loose and porous substance composed of graphite crystallites, forming a large number of network-like microporous structures, with a high surface activity and a large specific surface area. Therefore, the expandable graphite has excellent adsorption properties, especially for organic macromolecules. The zeolite and the expandable graphite can fully adsorb the aluminum citrate complex, playing a role of delaying the crosslinking. Meanwhile, by a freeze-drying technology through pre-freezing and sublimation drying, oxidative damages to the organics caused by high-temperature drying are avoided, thereby achieving non-destructive preparation of a crosslinking agent powder, followed by ball milling to obtain the high-purity, strong-dispersion, fully suspended, high-efficiency, and stable crosslinking material B. Expandable graphite itself is a desirable flame retardant, which has a damage resistance and a high expansion rate at high temperatures. During heating caused by the spontaneous combustion of coal, when the expandable graphite is exposed to a high temperature, its volume may rapidly expand by about 5 times to extinguish the flame. In addition, the generated graphite expanded material covers a surface of the coal body to isolate the contact with thermal energy radiation and oxygen. In conclusion, the flame retardancy of the gel-forming material is achieved by the flame retardancy of the expandable graphite.

2. In the initial dissolution stage, the gel-forming material A is spread evenly in a solution, where the fly ash with sesbania gum and anionic polyacrylamide is fully dissolved in the solution, and chain structures of the sesbania gum and polyacrylamide molecules are fully expanded in the solution. With continuous dissolution of the crosslinking material B in the solution, the zeolite and expandable graphite are dispersed in the solution, and during slow release of the adsorbed aluminum citrate complex, the crosslinking is delayed, and crosslinking ions generated by the aluminum citrate complex react with a part of hydroxyl groups on a polymer molecular chain, thereby realizing controlled gelation of the hydrogel for 5 min to 40 min. The fly ash-based environmentally-friendly hydrogel with the high water retention forms a jelly structure with a three-dimensional network, which can immobilize free water in the three-dimensional network, thereby avoiding the loss of free water. The hydrogel covering the coal surface greatly prolongs an effect of wetting the coal and isolating oxygen contact, which achieves a long-term inhibition effect on low-temperature oxidation of the coal. During use of the gel-forming material A, the biodegradable superabsorbent resin continuously absorbs water and expands to form solid fine particles that are uniformly distributed in the hydrogel. This not only enhances a water retention effect of the fire-preventing/fire-extinguishing hydrogel, but also greatly reduces fluidity of the hydrogel and improves stackability of the hydrogel. Accordingly, the hydrogel overcomes the shortcomings in the prior art that the slurry is easy to run off and cannot be stacked to a high place, and in a real sense, the long-term prevention and control is realized on the low-temperature oxidation and spontaneous combustion of coal.

3. In the present disclosure, the hydrogel is prepared with the biodegradable superabsorbent resin, anionic polyacrylamide, plant polysaccharide sesbania gum, and fly ash as base materials, with the inorganics zeolite and expandable graphite as carriers, and with the aluminum citrate complex as a crosslinking agent. The whole preparation process does not require harsh experimental environments such as a high temperature and a high pressure, has no harm to the underground workers during the construction, and especially avoids damages to the underground environment, stratum, and groundwater of the coal mine. As a result, the hydrogel is environmental-friendly with broad prospects for use.

DESCRIPTION OF THE EMBODIMENTS

The disclosure is further described below with reference to examples.

In the following examples, a gel-forming material A was prepared according to the following steps: (1) a biodegradable superabsorbent resin, anionic polyacrylamide, a sesbania gum, and fly ash (grade-II fly ash) were weighed according to a weight ratio of 1:0.5:0.5:98; the biodegradable superabsorbent resin, the anionic polyacrylamide, and the sesbania gum were mixed uniformly by ball milling for 30 min with a ball mill at 300 r/min to obtain a polymer powder; (2) the fly ash was added to the polymer powder according to the weight ratio, and then mixed uniformly by ball milling in the same way at 300 r/min for 30 min to obtain the gel-forming material A.

In the following examples, a crosslinking material B was prepared according to the following steps: (1) zeolite (with a particle size of 10 mesh), expandable graphite (with a particle size of 30 mesh), and an aluminum citrate complex were weighed according to a weight ratio of 78:20:2; the zeolite and the expandable graphite were mixed by ball milling for 30 min with a ball mill at 300 r/min to obtain an inorganic powder; (2) the inorganic powder was added to water according to a weight ratio of 20:80, and stirred at a room temperature for 50 min, such that the inorganic powder was completely dispersed in water to obtain a homogenous inorganic powder suspension; (3) the aluminum citrate complex was added to the inorganic powder suspension according to the weight ratio, and stirred at room temperature for 50 min, such that particles of the inorganic powder fully adsorbed the aluminum citrate complex to obtain a homogenous crosslinking material B suspension; (4) the homogenous crosslinking material B suspension was freeze-dried in a freeze-dryer at −30° C. and a vacuum degree of 10 Pa for 90 h to obtain a dry crosslinking material B block; and (5) the dry crosslinking material B block was subjected to ball milling at 300 r/min for 30 min to a particle size of 30 mesh or less, so as to obtain the crosslinking material B.

Example 1

A fly ash-based environmentally-friendly hydrogel with a high water retention for preventing and controlling spontaneous combustion of coal in a mine included the following raw materials in the following weight percentages: 10% of the gel-forming material A, 45% of the crosslinking material B, and water as a balance.

A preparation method of the fly ash-based environmentally-friendly hydrogel with the high water retention for preventing and controlling the spontaneous combustion of the coal in the mine included the following steps.

The gel-forming material A was added to water according to the weight percentages, and stirred at room temperature for 5 min to 10 min to obtain a homogenous composite suspension, and the crosslinking material B was added to the composite suspension according to the weight percentages, and stirred at room temperature for 3 min to 5 min to obtain the fly ash-based environmentally-friendly hydrogel with the high water retention for preventing and controlling the spontaneous combustion of the coal in the mine.

Example 2

A fly ash-based environmentally-friendly hydrogel with a high water retention for preventing and controlling spontaneous combustion of coal in a mine included the following raw materials in the following weight percentages: 15% of the gel-forming material A, 40% of the crosslinking material B, and water as a balance.

In this example, a preparation method of the fly ash-based environmentally-friendly hydrogel with the high water retention for preventing and controlling the spontaneous combustion of the coal in the mine was the same as that in Example 1.

Example 3

A fly ash-based environmentally-friendly hydrogel with a high water retention for preventing and controlling spontaneous combustion of coal in a mine included the following raw materials in the following weight percentages: 20% of the gel-forming material A, 35% of the crosslinking material B, and water as a balance.

In this example, a preparation method of the fly ash-based environmentally-friendly hydrogel with the high water retention for preventing and controlling the spontaneous combustion of the coal in the mine was the same as that in Example 1.

Example 4

A fly ash-based environmentally-friendly hydrogel with a high water retention for preventing and controlling spontaneous combustion of coal in a mine included the following raw materials in the following weight percentages: 25% of the gel-forming material A, 30% of the crosslinking material B, and water as a balance.

In this example, a preparation method of the fly ash-based environmentally-friendly hydrogel with the high water retention for preventing and controlling the spontaneous combustion of the coal in the mine was the same as that in Example 1.

Example 5

A fly ash-based environmentally-friendly hydrogel with a high water retention for preventing and controlling spontaneous combustion of coal in a mine included the following raw materials in the following weight percentages: 30% of the gel-forming material A, 25% of the crosslinking material B, and water as a balance.

In this example, a preparation method of the fly ash-based environmentally-friendly hydrogel with the high water retention for preventing and controlling the spontaneous combustion of the coal in the mine was the same as that in Example 1.

Example 6

A fly ash-based environmentally-friendly hydrogel with a high water retention for preventing and controlling spontaneous combustion of coal in a mine included the following raw materials in the following weight percentages: 30% of the gel-forming material A, 20% of the crosslinking material B, and water as a balance.

In this example, a preparation method of the fly ash-based environmentally-friendly hydrogel with the high water retention for preventing and controlling the spontaneous combustion of the coal in the mine was the same as that in Example 1.

The fly ash-based environmentally-friendly hydrogels with the high water retention for preventing and controlling the spontaneous combustion of the coal in the mine prepared in Examples 1 to 6 were collected for determination of a gelation time, a water retention time, and a degradation time. The gelation time referred to a time required for the hydrogel with the high water retention to change from a flowable solution state to being able to be "picked up" with a glass rod; a method for measuring the water retention time was as follows: 500 g of each hydrogel was added in a beaker, placed in a cool and ventilated laboratory at a room temperature, weighed every 24 h, and measured to obtain the water retention time for keeping 50% of water without loss; and the degradation time referred to a time until a final structure of the hydrogel collapsed. The specific data were shown in Table 1.

TABLE 1

Degradation time and water retention time of fly ash-based environmentally-friendly hydrogels with high water retention in different raw material ratios

| Serial number | Raw materials of fly ash-based environmentally-friendly hydrogels with high water retention and weight percentages thereof | | | Gelation time (min) | Degradation time (d) | Water retention time (d) |
| --- | --- | --- | --- | --- | --- | --- |
| | Gel-forming material A | Crosslinking material B | Water | | | |
| 1 | 10% | 45% | 45% | 40 | 83 d | 57 d |
| 2 | 15% | 40% | 45% | 25 | 85 d | 58 d |
| 3 | 20% | 35% | 45% | 12 | 86 d | 61 d |
| 4 | 25% | 30% | 45% | 8 | 90 d | 60 d |
| 5 | 30% | 25% | 45% | 5 | 92 d | 55 d |
| 6 | 30% | 20% | 50% | 20 | 80 d | 53 d |

It can be seen from Table 1 that for the fly ash-based environmentally-friendly hydrogel with the high water retention for preventing and controlling the spontaneous combustion of the coal in the mine according to the present disclosure, the gelation time could be controlled at 5 min to 40 min, depending on the ratio of raw materials, which was conducive to adjustment and control in the coal mine according to different site conditions and construction sites, so as to achieve better effects. In addition, the fly ash-based environmentally-friendly hydrogel with the high water retention had a degradation time of about 80 d, and a water retention time extended to 53 d or longer. This was because a dissolution reaction of the gel-forming material A and the crosslinking material B in water might form a jelly structure with a stable three-dimensional network, thereby immobilizing free water in the three-dimensional network to cover the coal surface. The biodegradable superabsorbent resin not only further improved the water retention capacity of the hydrogel, but also formed solid and high water-containing fine particles that were uniformly distributed therein, thereby enhancing the stacking property of the hydrogel.

In the present disclosure, the zeolite and the expandable graphite have excellent adsorption properties and can fully adsorb the aluminum citrate complex. The adsorbed aluminum citrate complex is slowly released in the solution, and crosslinking ions are generated for crosslinking with polymer molecules to form a jelly structure with a three-dimensional network, playing a role of delaying the crosslinking. In addition, the expandable graphite absorbs heat and expands when exposed to the high temperature, and can generate a graphite expanded material to cover a surface of burning coal to isolate the contact with thermal energy radiation and oxygen, so as to achieve a desirable flame-retardant effect.

In the present disclosure, the hydrogel can meet the fire-preventing and fire-extinguishing requirements such as high-level filling, coverage and oxygen barrier, and water retention and cooling in the underground goaf of the coal mine, which greatly reduces a labor of underground workers, improves a prevention and control efficiency for hidden dangers from the spontaneous combustion of coal, and meets the field application requirements in coal mines.

Although the above examples provide some embodiments of the present disclosure, for those skilled in the art, without departing from a basic principle of the present disclosure, those changes and modifications in the proportions of components and replacements of the same types of materials that are made to the examples should all fall within the scope of the claims of the present disclosure.

What is claimed is:
1. A fly ash-based environmentally-friendly hydrogel with a high water retention for preventing and controlling spontaneous combustion of coal in a mine, comprising the following raw materials in the following weight percentages: 10% to 30% of a gel-forming material A, 20% to 45% of a crosslinking material B, and water as a balance; wherein the gel-forming material A is prepared by physical blending of a biodegradable superabsorbent resin, anionic polyacrylamide, a sesbania gum, and fly ash in a first weight ratio of (1-3):(0.5-1):(0.5-1):(95-98); and the crosslinking material B is prepared by subjecting zeolite, expandable graphite, and an aluminum citrate complex in a second weight ratio of (60-78):(20-36):(2-4) to mixing, dispersing, adsorbing, and freeze-drying; and the fly ash-based environmentally-friendly hydrogel with the high water retention for preventing and controlling the spontaneous combustion of the coal in the mine is prepared by the following steps:
1) adding the gel-forming material A to water according to the weight percentages, followed by stirring at a room temperature for 5 min to 10 min to obtain a homogenous composite suspension; and
2) adding the crosslinking material B to the composite suspension according to the weight percentages, followed by stirring at room temperature for 3 min to 5 min to obtain the fly ash-based environmentally-friendly hydrogel with the high water retention for preventing and controlling the spontaneous combustion of the coal in the mine.

2. The fly ash-based environmentally-friendly hydrogel with the high water retention for preventing and controlling the spontaneous combustion of the coal in the mine according to claim 1, wherein the gel-forming material A is prepared by the following steps:
- 1.1) weighing the biodegradable superabsorbent resin, the anionic polyacrylamide, and the sesbania gum according to the first weight ratio, followed by uniform mixing by ball milling to obtain a polymer powder; and
- 1.2) adding the fly ash to the polymer powder according to the first weight ratio, followed by uniform mixing by ball milling to obtain the gel-forming material A.

3. The fly ash-based environmentally-friendly hydrogel with the high water retention for preventing and controlling the spontaneous combustion of the coal in the mine according to claim 2, wherein in the gel-forming material A, the fly ash is grade-II fly ash.

4. The fly ash-based environmentally-friendly hydrogel with the high water retention for preventing and controlling the spontaneous combustion of the coal in the mine according to claim 2, wherein in the steps 1.1) and 1.2), the ball milling is performed at 100 r/min to 300 r/min for 10 min to 30 min.

5. The fly ash-based environmentally-friendly hydrogel with the high water retention for preventing and controlling the spontaneous combustion of the coal in the mine according to claim 1, wherein the crosslinking material B is prepared by the following steps:
- 2.1) weighing the zeolite and the expandable graphite according to the second weight ratio, followed by uniform mixing by ball milling to obtain an inorganic powder;
- 2.2) adding the inorganic powder to water according to a third weight ratio of (20-30):(70-80), followed by stirring at room temperature for 30 min to 50 min, such that the inorganic powder is completely dispersed in the water to obtain a homogenous inorganic powder suspension;
- 2.3) weighing the aluminum citrate complex according to the second weight ratio, adding the aluminum citrate complex to the inorganic powder suspension, followed by stirring at room temperature for 30 min to 50 min, such that particles of the inorganic powder fully adsorb the aluminum citrate complex to obtain a homogenous crosslinking material B suspension;
- 2.4) freeze-drying the crosslinking material B suspension to obtain a dry crosslinking material B block; and
- 2.5) subjecting the crosslinking material B block to ball milling to a particle size of 30 mesh or less to obtain the crosslinking material B.

6. The fly ash-based environmentally-friendly hydrogel with the high water retention for preventing and controlling the spontaneous combustion of the coal in the mine according to claim 5, wherein in the crosslinking material B, the zeolite has a particle size of 10 mesh to 30 mesh, and the expandable graphite has a particle size of 10 mesh to 30 mesh.

7. The fly ash-based environmentally-friendly hydrogel with the high water retention for preventing and controlling the spontaneous combustion of the coal in the mine according to claim 5, wherein in the steps 2.1) and 2.5), the ball milling is performed at 100 r/min to 300 r/min for 10 min to 30 min.

8. The fly ash-based environmentally-friendly hydrogel with the high water retention for preventing and controlling the spontaneous combustion of the coal in the mine according to claim 5, wherein in the step 2.4), the freeze-drying is performed at −60° C. to −30° C. and a vacuum degree of 5 Pa to 10 Pa for 40 h to 90 h.

9. The fly ash-based environmentally-friendly hydrogel with the high water retention for preventing and controlling the spontaneous combustion of the coal in the mine according to claim 1, wherein in the gel-forming material A, the fly ash is grade-II fly ash.

10. The fly ash-based environmentally-friendly hydrogel with the high water retention for preventing and controlling the spontaneous combustion of the coal in the mine according to claim 1, wherein in the crosslinking material B, the zeolite has a particle size of 10 mesh to 30 mesh, and the expandable graphite has a particle size of 10 mesh to 30 mesh.

\* \* \* \* \*